(12) United States Patent
Xie et al.

(10) Patent No.: US 6,287,721 B1
(45) Date of Patent: Sep. 11, 2001

(54) PROCESS FOR MANUFACTURING ELECTROCHEMICAL CELLS

(75) Inventors: Like Xie, Naperville; Thomas J. Roberts, Bolingbrook; Steve Kaganovich, Glenview; Zhiwei Zang, Naperville; Mohammed Alamgir, Bolingbrook, all of IL (US)

(73) Assignee: Thomas & Betts International, Inc., Sparks, NV (US)

( * ) Notice: Subject to any disclaimer, the term of this patent is extended or adjusted under 35 U.S.C. 154(b) by 0 days.

(21) Appl. No.: 09/405,200

(22) Filed: Sep. 24, 1999

Related U.S. Application Data

(60) Provisional application No. 60/101,589, filed on Sep. 24, 1998.

(51) Int. Cl.$^7$ ...................................................... H01M 6/10
(52) U.S. Cl. ............................................. 429/152; 429/211
(58) Field of Search .................................... 429/127, 152, 429/158, 162, 154, 160, 149, 211; 29/623.1, 623.5

(56) References Cited

U.S. PATENT DOCUMENTS

| | | |
|---|---|---|
| 4,192,049 | 3/1980 | Parkinson et al. . |
| 5,300,373 | 4/1994 | Shackle . |
| 5,456,000 | 10/1995 | Gozdz et al. . |
| 5,460,904 | 10/1995 | Gozdz et al. . |
| 5,470,357 | 11/1995 | Schmutz et al. . |
| 5,498,489 | 3/1996 | Dasgupta et al. . |
| 5,525,441 | 6/1996 | Reddy et al. . |
| 5,582,931 | 12/1996 | Kawakami . |
| 5,716,735 | 2/1998 | Muffoletto et al. . |
| 5,744,261 | 4/1998 | Muffoletto et al. . |
| 5,776,628 | 7/1998 | Kraft et al. . |
| 5,911,947 | 6/1999 | Mitchell . |

*Primary Examiner*—Stephen Kalafut
*Assistant Examiner*—Susy Tsang
(74) *Attorney, Agent, or Firm*—Hoffman & Baron, LLP

(57) ABSTRACT

A manifold bi-cell assembly for electrochemical cells such as a polymer lithium ion battery is provided along with a method of manufacture thereof. The disclosed electrochemical cell includes an elongate planar separator or substrate formed of an elastic material. A plurality of discrete anodes with laterally offset leads is positioned in longitudinally spaced apart relationship to one another and positioned between a pair of substrates to create a sandwich assembly wherein adjacent anodes have a substrate interface therebetween. A plurality of cathodes with laterally offset leads corresponding in size, shape and number to the plurality of anodes is also positioned in longitudinal spaced apart relation on an opposed side of said substrate and overlying the anodes. The substrate is folded along its interfaces to create a manifold assembly wherein the anodes and cathodes are superimposed in a stacked configuration with the leads of the cathodes being offset from the leads of the anodes.

15 Claims, 3 Drawing Sheets

PROCESS FOR MANUFACTURING ELECTROCHEMICAL CELLS

This application claims priority to U.S. Ser. No. 60/101,589, filed Sep. 24, 1998, and entitled "Manufacturing Process for Electrochemical Cells".

FIELD OF THE INVENTION

The present invention is directed to an economical method of manufacturing electrochemical cells for use in portable devices such as mobile phones, pagers, laptop computers, hand held terminals and wireless communication devices. In particular, the present invention is directed to a method of optimizing the production of lithium-ion polymer batteries so as to significantly increase the number of cells produced and further optimize the power density attained therefrom.

BACKGROUND OF THE INVENTION

Polymer lithium ion batteries represent the state-of-the-art in rechargeable battery technology. A rechargeable lithium battery cell contains an electrolyte through which lithium atoms from a source electrode move between electrodes during charge/discharge cycles. Such batteries are often packaged in a rechargeable lithium-polymer battery pack. This pack utilizes ion conductors having a predetermined formula that is known in the art to provide high energy density, high performance reliability and a prolonged shelf life in a wide range of applications. In the course of the discussion herein, the terms "battery" and "cell" will be used interchangeably.

Plastic lithium ion cells usually consist of a conductive polymer membrane in a lithium salt matrix sandwiched between an anode and a cathode. This type of battery usually contains carbon as an intercalation anode and a metal oxide such as $LiCoO_2$ or $LiMn_2O_4$ as a cathode. A microporous membrane of a conductive polymer such as polyethylene acts as a separator, while solutions of lithium salts (such a $LiPF_6$) in organic solvents (such as ethylene carbonate and dimethyl carbonate) are used as electrolytes.

Significant weight savings are realized with lithium ion cells which meet the need for reduced battery size and shape in diminutive portable electronic devices. Furthermore, these cells present no electrical hazard when fully charged. Such cells are less sensitive to damage from dropping and the shocks and vibrations of normal use. The cells further demonstrate superior results when subjected to high-rate cycling, mechanical shock, thermal shock, vibration, over voltage, under voltage, short circuits, automobile battery charging, nail penetration and high pressure tests. In addition, there is no liquid to leak and no metallic lithium present, enabling the exercise of safe battery handling procedures. The cell is not an environmental hazard when discarded, and the costs associated with disposal of spent or damaged cells are minimized. Shipping costs are likewise reduced since no special transportation permits or export documents are required.

In the midst of these apparent advantages, the conventional process for manufacturing remains complex and expensive, comprising a multiplicity of independently executed steps. As illustrated in FIG. 1, an electrochemical cell is constructed by individually cutting a plurality of anodes, cathodes and separators (not shown) to the required shapes and sizes. Individual anodes are sandwiched between two separators by heat lamination. The anode-separator assembly is subsequently sandwiched between a pair of cathodes by heat lamination to prepare a plurality of bi-cells 12. Bi-cells 12 are subsequently loaded onto and unloaded from extraction trays to remove excess solvent therefrom. Finally, the desired number of bi-cells 12 are consecutively stacked upon one another to produce make a complete cell 10, as further shown in FIG. 1A.

As it is evident from the above steps, electrochemical cell manufacturing involves many labor intensive handling operations, each of which incurs substantial investments of time and capital. The conventional manufacturing process described above represents a labor-intensive "pick and place" operation that retards the manufacturing process and thereby accelerates the costs associated therewith. Individual handling of bi-cells is not only tedious; it also fosters improper alignment of the components of the bi-cell assembly, leading to improper cell performance and limited yield of the number of cells produced per production run.

Attempts have been made to overcome the problems inherent in the above described mode of manufacture. U.S. Pat. No. 5,456,000 to Gozdz et al., for example, discloses a method of producing lithium-ion rechargeable battery cells. The method includes the steps of arranging in sequence a positive electrode element, a separator element and a negative electrode element. Each of the electrode and separator elements is fabricated from a flexible, polymeric matrix composition substantially devoid of electrolyte salt. Each element is bonded to contiguous elements at a respective interface to form a unitary flexible laminate structure.

Similarly, in related U.S. Pat. No. 5,470,357 to Schmutz et al., an alternative method of making a rechargeable battery structure is disclosed. Such a method includes the steps of arranging contiguously a positive current collector element, a positive electrode element, a separator element, a negative electrode element and a negative current collector element. Each of the electrode and separator elements comprises a flexible, polymeric matrix composition in the form of a self-supporting film. Each of the collector elements comprises a flexible electrically conductive foil which has been surface treated with a compatible polymeric material. Each element is bonded to contiguous elements at the interfaces thereof by applying sufficient heat and pressure to form a unitary flexible laminate structure.

The above-described methods, while increasing the yield of electrochemical cells produced in a manufacturing run, compromise the integrity of such cells so as to render them undesirable for prolonged use in expensive electronic components. The resultant cells consistently suffer from instances of cracking attributable to the folding of elongate film configurations, thereby leading to unpredictable cell imperfections and failures that affect cell performance and reliability.

It is therefore desirable to provide an improved method of manufacturing electrochemical cells which not only amplifies the number of units produced but also optimizes the arrangement of components in each unit while ensuring cell performance and integrity.

SUMMARY OF THE INVENTION

It is an object of the present invention to provide an improved method of manufacturing electrochemical cells.

It is another object of the present invention to significantly increase the speed and yield of manufacture of electrochemical cells It is a yet another object of the present invention to promote proper alignment of components in an electrochemical cell assembly.

It is still another object of the present invention to facilitate flexibility in electrochemical cell design.

It is a further object of the present invention to augment the power density of an electrochemical cell while providing a compact cell configuration.

In the efficient attainment of these and other objects, the present invention provides a manifold bi-cell assembly for electrochemical cells and a method of manufacture thereof. The disclosed electrochemical cell assembly includes an elongate planar separator or substrate formed of an elastomeric material. A plurality of discrete anodes is positioned in longitudinally spaced apart relationship and positioned between a pair of substrates to create a sandwich assembly wherein adjacent anodes have a substrate interface therebetween. A plurality of cathodes corresponding in size, shape and number with the anodes is also positioned in longitudinal spaced apart relation on an opposed side of said substrate in alternating registry with the anodes. The substrate is folded along its interfaces to create a manifold assembly wherein the anodes and cathodes are in stacked alternating registry.

DETAILED DESCRIPTION OF THE PREFERRED EMBODIMENTS

Figure 1B:
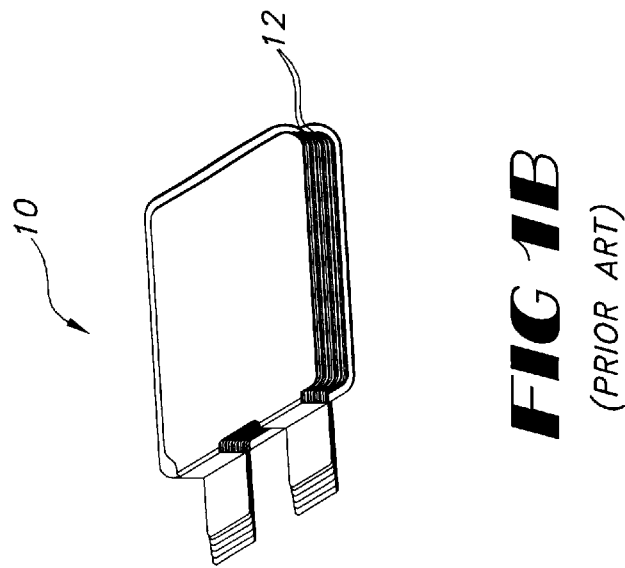
FIGS. 1A and 1B show an electrochemical cell assembly of the prior art.
Figure 1A:
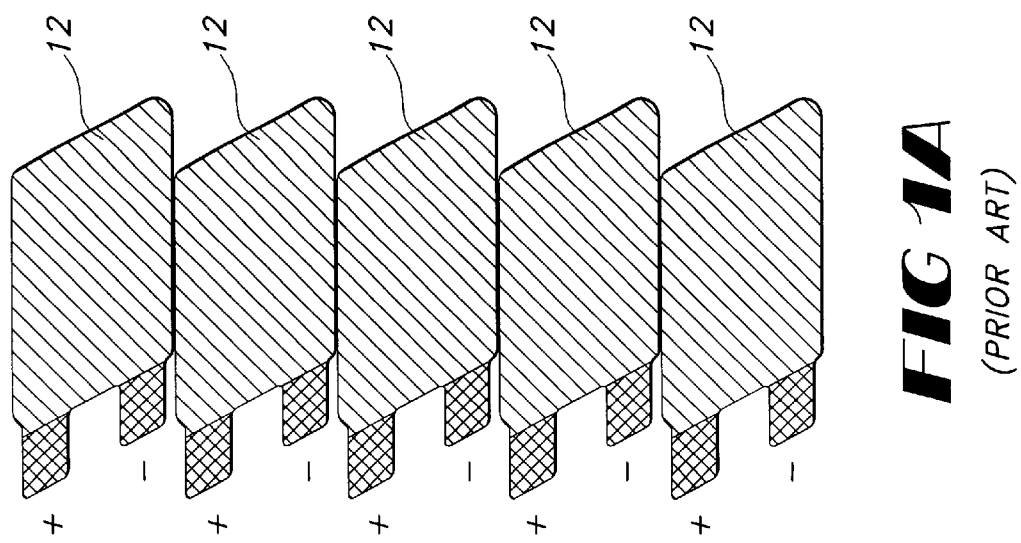

The present invention is directed to an electrochemical cell assembly and a method of manufacture thereof. Such an assembly is made up of a plurality of bi-cells, wherein each bi-cell is produced from a sandwich of anode and cathode components held together by a planar substrate made of a separator material. Each electrochemical cell comprises a plurality of bi-cells to create electrochemical cell assemblies of desired number and size in accordance with the specifications of a particular application or device in which such cells are employed.

Now referring to the FIGS. 2–5, wherein like elements are identically numbered, a manifold electrochemical cell assembly 20 of the present invention is provided which includes a plurality of bi-cells 22 in a Z-shaped configuration. Each bi-cell 22 is formed of an anode 24 of predetermined shape and size interposed between a pair of planar separator films 26 acting as a substrate. On a face of each separator film 26 not in contact with an anode 24, a cathode 28 is positioned thereon so as to be in overlying registry with a corresponding anode 24. Folds are effected at bi-cell interfaces 30 defined by spaces between the bi-cells where separator film 26 connects adjacent bi-cells in overlying registry with one another.

Figure 3:
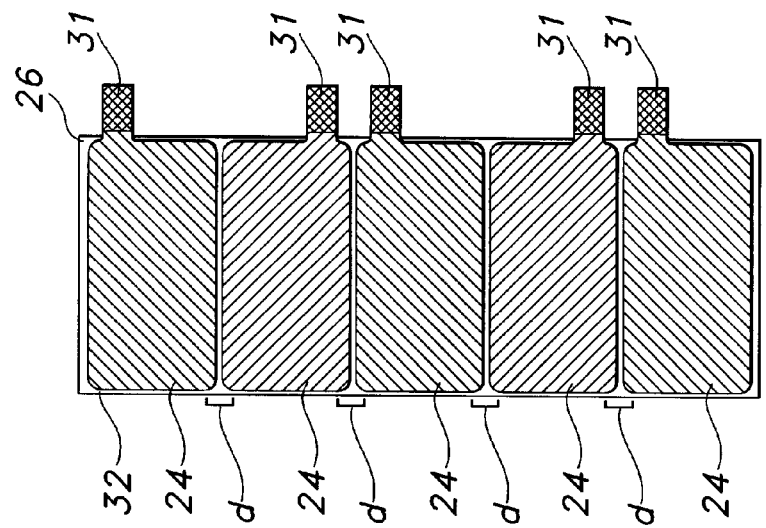
FIG. 3 shows a front view of an electrochemical cell of the present invention during manufacture thereof.
Figure 2:
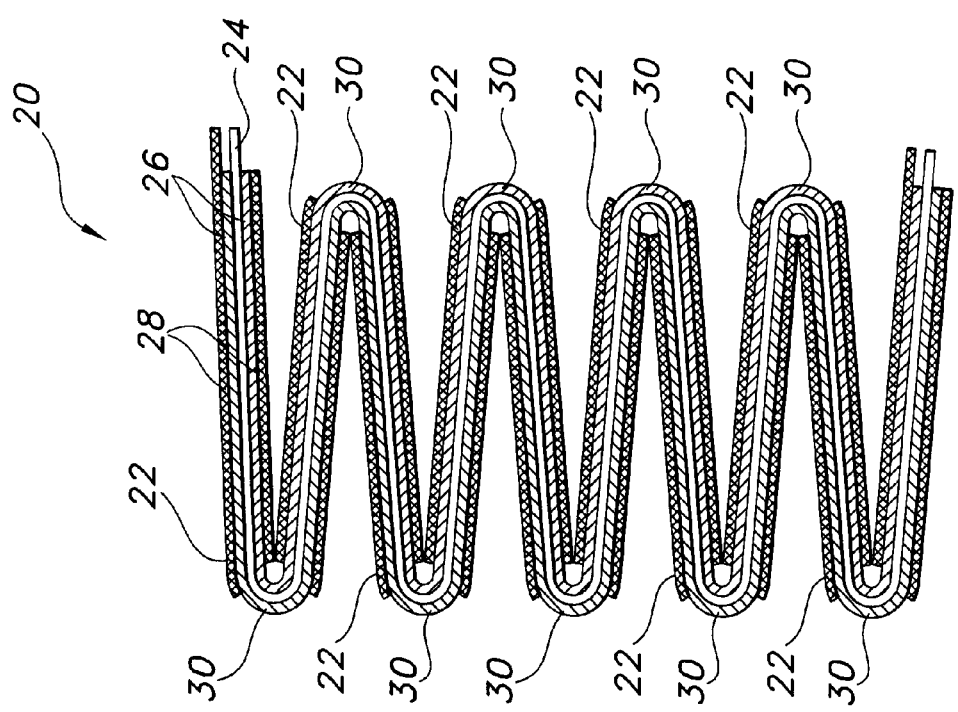
FIG. 2 shows an electrochemical cell assembly of the present invention.
Figure 5:
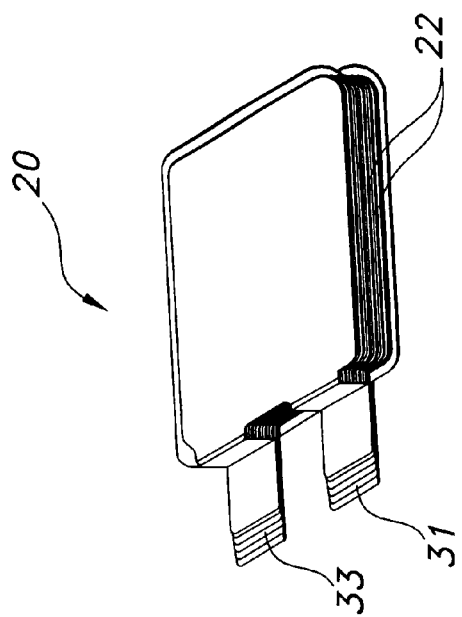
FIG. 5 shows a top perspective view of an electrochemical cell assembly of the present invention after placement of bi-cells in alternating stacked registry with one another.
Figure 4:
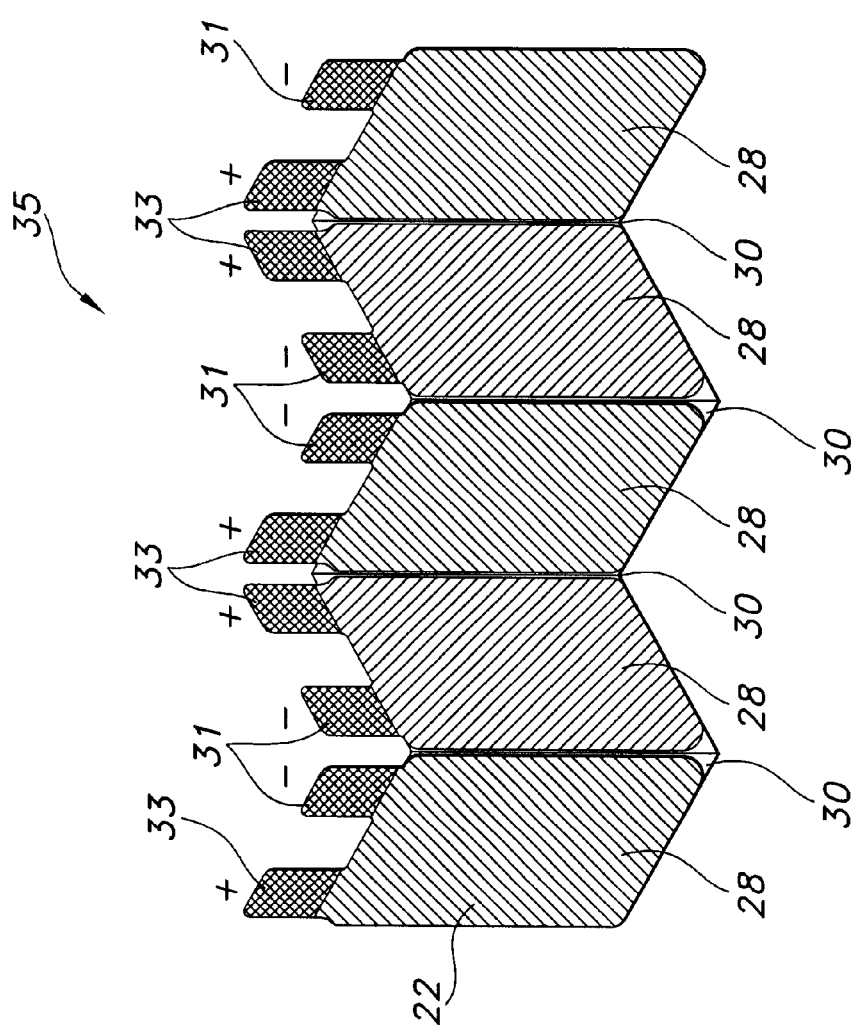
FIG. 4 shows a front perspective view of an electrochemical cell assembly of the present invention after manufacture is complete.

Now referring to FIGS. 3 through 5, the manufacture of cell assembly 20 can be described.

Each bi-cell 22 comprises multiple layers of electrode and separator materials. It is first necessary to prepare individual anodes and cathodes which are to be assembled into an electrochemical cell assembly along with a film substrate. As shown in FIG. 3, independent anodes 24 are sized and shaped so as to fit along a planar surface of separator film or substrate 26. Anodes 24 are placed in longitudinal spaced relation to one another so as to define a common edge 32 along substrate 26. A copper mesh grid is provided as an extending tab 31 which is laid upon each anode 24 and laminated thereto. Copper tab 31 provides a contact lead that serves as a convenient battery terminal during subsequent operation of the electrochemical cell.

A second separator film or substrate 26 is placed atop this configuration of anodes 24 so as to create a sandwich structure that preserves the longitudinal relation thereof. A minimum spacing d is preserved between adjacent anodes corresponding to a bi-cell interface 30 in a completed cell assembly.

Now referring to FIG. 4, a plurality of cathodes 28 corresponding to anodes 24 is provided on each substrate 26 and laminated thereon to form a multi-layer laminate strip 35. Each cathode includes an extending aluminum mesh tab 33 laminated thereto which is a contact lead that serves as a convenient battery terminal for each cathode during operation of the electrochemical cell. Cathodes 28 are provided on each side of a corresponding anode 24 in overlying registry to form each bi-cell 22. The placement of cathodes 28 in relation to anodes 24 ensures retention of interfaces 30 between adjacent bi-cells.

A cutting and folding operation can now be performed on strip 35 to produce a bi-cell of desired configuration. Strip 35 is slit at interfaces 30 to produce cell assemblies having a desired number of bi-cells 22. For example, if one requires 5 bi-cells for a cell assembly (as shown in FIG. 4), cutting will be effected between each set of five bi-cells. Therefore, instead of handling 5 different bi-cells to make a cell assembly, only one multi-laminate strip 35 is required for loading onto and unloading from the extraction trays. Extracted bi-cells are folded along interfaces 30 of strip 35 in what is described as a Z-fold, to form a Z-shaped manifold bi-cell such as cell assembly 20 shown in FIG. 2. Such a cell assembly can be packaged into a compact form for convenient use and safe handling, as depicted in FIG. 5.

Each of the copper tabs 31 and aluminum tabs 33 is laterally offset from a corresponding electrode so as to ensure overlying registry of the contact leads upon production of the Z-fold. When anodes 24 are placed along substrate 26, placement thereof includes arranging anodes 24 and copper tabs 31 in an alternating pattern. Cathodes 28, having aluminum tabs 33 affixed thereto, are likewise placed on substrate 26 so that cathodes 28 are arranged with laterally offset tabs 33 in an offset pattern (see FIG. 4). Upon production of the Z-fold all of copper tabs 31 are in overlying registry with one another, as are aluminum tabs 33. In this manner, alignment of such contact leads is consistent and reliable, thereby ensuring proper operation of the resultant cell.

An illustration of the execution of the above described process and an electrochemical cell derived therefrom is provided in the following example. It is understood that this example is merely illustrative of the types of material combinations anticipated by this disclosure and in no way limits the application thereof in the manufacture of electrochemical cells.

EXAMPLE

Films and compositions which comprise the various elements of a polymer lithium ion battery are provided as follows:

Anode:
Graphite: 65–75%
Carbon black: Up to 2%
Hexafluoropropylene -or- Vinylidine Fluoride Copolymer (VDF): 13–18%
Dibutyl Phthalate (DBP): 10–15%
Cathode:
Lithium cobalt oxide ($LiCoO_2$): 65–75%
Carbon black: 5–7%
VDF: 5–10%
DBP: 15–18%
Separator (Substrate):
VDF: 28–32%
Silicon Dioxide ($SiO_2$): 20–25%
DBP: 40–60%

A copper mesh that is coated with PVDF is sintered at 400° C. and laminated with an anode film on both sides, thereby producing an anode laminate. Similarly, an aluminum mesh that is coated with poly(methyl methacrylate) is laminated with cathode film on each side thereof to form a cathode laminate.

The manufacture of a polymer lithium ion battery begins with production of a manifold bi-cell assembly wherein a sandwich of five laminates is assembled. Specifically, the anode laminate is cut into desired sizes and numbers (dependent upon the application of the final product) to produce a plurality of discrete anodes. The anodes are longitudinally spaced along a common plane. A separator film or web, acting as a substrate, is continuously placed along opposing sides of each anode such that the anodes retina their longitudinal spaced configuration between the pair of separator webs. On each side of the anodes, a corresponding number of cathodes are provided which have been cut and sized from the cathode laminate to correspond to the anodes placed within the separator web. The cathodes are placed on each side of the anodes atop the in overlying registry therewith and connected to the anode-substrate assembly by a melding process such as lamination. This bi-cell assembly of five laminates is subsequently tested to determined its electrical characteristics.

The bi-cell assembly is then placed upon an extraction tray and immersed in methanol in a closed extraction vessel to remove DBP therefrom. The process is controlled within a bath temperature ranging from room temperature to 40° C., and the time for extraction ranges from 15 to 45 minutes. The bi-cell assembly is then vacuum dried and tested again to determine its electrical characteristics.

The bi-cell assembly is subsequently run through a vacuum drying chamber in a dry room. A plastic laminated aluminum casing is crimped around the battery pack and electrolyte added in the dry chamber (i.e. under 1% humidity) in the dry room. The electrolyte is preferably a mixture which contains lithium hexafluorophosphate, methyl ether carbonate and ethylene carbonate cyclic ester. The batteries are then charged in a formation battery charge unit and processed through a degassing and reseal machine. After a packaging process step, the product is labeled and packaged for shipment.

The polymer lithium ion batteries manufactured in accordance with the present inventive process are produced with a variety of materials and processing methods. The manufacturing process includes the use of laminated anodes, cathodes and separators which are manufactured based upon predetermined formulations and materials specified for fabricating films and laminates. The present invention enables rapid production of such electrochemical cells without compromising the capacity or performance thereof.

The above-described electrochemical cell and associated methods of manufacture offer a number of advantages over conventional, liquid-electrolyte-based lithium ion batteries. The disclosed cell contains no free liquid electrolytes and permits the use of lightweight plastic pouches as cell casings. This leads to high specific energy, especially in a prismatic format. The new processes significantly simplify the manufacturing steps while increasing the speed. The above-described process significantly simplifies and expedites a stacking operation to make the cells, thereby facilitating alignment of the bi-cells with respect to each other. Additional advantages include shape flexibility and the ability to manufacture the cell with a very thin and flat profile, making the cell attractive for use in many lightweight consumer devices such as cellular phones, pagers and laptop computers.

Various changes to the foregoing described and shown structures would now be evident to those skilled in the art. Accordingly, the particularly disclosed scope of the invention is set forth in the following claims.

What is claimed is:

1. A method of forming an electrochemical cell assembly, comprising the steps of:
    providing at least one elongate substrate having opposed planar surfaces;
    providing a plurality of discrete anodes having laterally offset contact leads;
    arranging said anodes at spaced apart locations longitudinally along one surface of said substrate with said laterally offset leads in an alternating pattern;
    placing a plurality of discrete cathodes at spaced apart locations longitudinally along an opposed surface of said substrate overlying said anodes to form a plurality of spaced apart bi-cells; and
    folding said substrate at a location between said spaced apart bi-cells to form a stacked cell assembly of alternating cathodes and anodes.

2. The method of claim 1 wherein said contact leads include a copper mesh tab laminated to each of said anodes.

3. The method of claim 1 wherein said cathodes include contact leads extending in a laterally offset relation therefrom and wherein said placing step includes arranging said cathodes with said laterally offset leads in an alternating pattern.

4. The method of claim 3 wherein said contact leads includes an aluminum mesh tab laminated to said each of said cathodes.

5. The method of claim 1 wherein a second substrate is overlyingly placed atop said longitudinally spaced anodes so as to to create a sandwich structure.

6. The method of claim 1 wherein spacing is preserved between adjacent bi-cells to create a bi-cell interface that accommodates said folding step.

7. The method of claim 6 wherein said substrate is slit to produce at least one electrochemical cell assembly having a plurality of bi-cells therein.

8. The method of claim 7 wherein said bi-cells are folded along said interfaces to form a Z-shaped assembly.

9. An electrochemical cell assembly, comprising:
    an elongate planar substrate;
    a plurality of anodes having lateral offset leads positioned in longitudinally spaced apart relationship on one surface of said substrate; and
    a corresponding plurality of cathodes having laterally offset leads positioned in longitudinally spaced apart relation on an opposed side of said substrate overlying said anodes, said leads of said cathodes being offset from said leads of said anodes;

wherein said substrate is folded to a position wherein said anodes and said cathodes are superimposed in a stacked configuration.

10. The electrochemical cell assembly of claim 9 wherein said anode contact leads include a copper mesh tab laminated to each of said anodes.

11. The electrochemical cell assembly of claim 9 wherein said cathode contact leads include an aluminum mesh tab laminated to said each of said cathodes.

12. The electrochemical cell assembly of claim 9 wherein a second elongate planar substrate is overlappingly placed on said anodes so as to create a sandwich structure that preserves the longitudinal relation thereof.

13. The electrochemical cell assembly of claim 12 wherein a spacing is preserved between adjacent anodes to create a bi-cell interface that accommodates folding of said substrate along each said interface.

14. The electrochemical cell assembly of claim 13 wherein said substrate is slit to produce at least one electrochemical cell.

15. The electrochemical cell assembly of claim 14 wherein said bi-cells are folded along said interfaces to form a Z-shaped assembly.

* * * * *